(12) United States Patent
Singh et al.

(10) Patent No.: US 8,917,253 B2
(45) Date of Patent: Dec. 23, 2014

(54) METHOD AND APPARATUS PERTAINING TO THE INTERLACING OF FINGER-BASED AND ACTIVE-STYLUS-BASED INPUT DETECTION

(75) Inventors: Amit Pal Singh, Waterloo (CA); Premal Parekh, Waterloo (CA); James Alexander Robinson, Elmira (CA)

(73) Assignee: BlackBerry Limited, Waterloo (CA)

( * ) Notice: Subject to any disclaimer, the term of this patent is extended or adjusted under 35 U.S.C. 154(b) by 190 days.

(21) Appl. No.: 13/600,800

(22) Filed: Aug. 31, 2012

(65) Prior Publication Data

US 2014/0062898 A1  Mar. 6, 2014

(51) Int. Cl.
*G06F 3/041* (2006.01)

(52) U.S. Cl.
USPC .......................................... 345/173; 345/156

(58) Field of Classification Search
CPC ......... G06F 3/033; G06F 3/038; G06F 3/041; G06F 3/0416; G06F 3/042; G06F 2203/033; G06F 2203/038; G06F 2203/041; G09G 5/00
USPC ............... 345/156, 173, 175, 179; 178/18.01, 178/18.09, 19.01
See application file for complete search history.

(56) References Cited

U.S. PATENT DOCUMENTS

| | | | |
|---|---|---|---|
| 4,686,332 A | 8/1987 | Greanias et al. | |
| 5,367,453 A * | 11/1994 | Capps et al. | 715/235 |
| 5,670,755 A * | 9/1997 | Kwon | 178/18.05 |
| 7,023,427 B2 * | 4/2006 | Kraus et al. | 345/173 |
| 8,493,360 B2 * | 7/2013 | Kremin et al. | 345/174 |
| 2004/0155871 A1 * | 8/2004 | Perski et al. | 345/174 |
| 2005/0162411 A1 * | 7/2005 | Berkel van | 345/179 |
| 2008/0029316 A1 | 2/2008 | Jaeger et al. | |
| 2010/0085325 A1 * | 4/2010 | King-Smith et al. | 345/174 |
| 2010/0252335 A1 | 10/2010 | Orsley | |
| 2011/0025619 A1 | 2/2011 | Joguet et al. | |
| 2011/0025629 A1 | 2/2011 | Grivna et al. | |
| 2011/0254802 A1 | 10/2011 | Philipp | |
| 2012/0105362 A1 | 5/2012 | Kremin et al. | |
| 2012/0256853 A1 | 10/2012 | Chan et al. | |

FOREIGN PATENT DOCUMENTS

| | | |
|---|---|---|
| EP | 0483709 A2 | 10/1991 |
| WO | 2011023225 A1 | 3/2011 |
| WO | 2012/057887 A1 | 5/2012 |

OTHER PUBLICATIONS

Extended European Search Report from related European Patent Application No. 12182692.9 dated Feb. 4, 2013; 5 pages.

* cited by examiner

*Primary Examiner* — Joe H Cheng
(74) *Attorney, Agent, or Firm* — Fitch, Even, Tabin & Flannery LLP

(57) ABSTRACT

A control circuit controls detection of both finger-based input and active-stylus-based input as input via a display. In particular, during a single scan period, the control circuit interleaves use of the finger-detection resources with use of the active-stylus-detection resources.

11 Claims, 2 Drawing Sheets

METHOD AND APPARATUS PERTAINING TO THE INTERLACING OF FINGER-BASED AND ACTIVE-STYLUS-BASED INPUT DETECTION

FIELD OF TECHNOLOGY

The present disclosure relates to electronic devices, and more particularly to the detection of user input.

BACKGROUND

Many electronic devices, including various portable electronic devices such as so-called smartphones and tablet/pad-styled computers, use a display as a primary mechanism by which a user enters input (such as, but not limited to, alphanumeric information, selections, instructions, and so forth). These displays often utilize any of a variety of techniques to sense a particular present location (and/or movement) of the user's finger or stylus with respect to the display (with the so-called touchscreen display serving as a good example in these regards).

Such a display will sometimes employ active technology to detect a user's finger-based input. This might comprise, for example, transmitting light beams from a large plurality of light transmitters and detecting when particular light beams are broken by the user's finger. In a somewhat analogous manner a display may use an active technology to detect the interactions of the display with a user-borne stylus. In many cases the stylus comprises an active stylus that actively emits one or more signals that the display can receive and utilize, at least in part, to detect a present location of at least a part of the stylus (such as the tip of the stylus) with respect to the display.

Unfortunately, neither a finger-based approach nor a stylus-based approach comprises an objectively best approach for all users, displays, and application settings. In some cases, in fact, it can be desirable for a given device to support both a finger-based approach as well as a stylus-based approach. Accordingly, there are display-based devices that utilize two or more detection methodologies to thereby accommodate both a finger-based and a stylus-based modality of user interaction.

As noted above, however, these various detection technologies are typically "active" and hence consume power. Controlling power consumption has been, and remains, a significant design concern for manufacturers of portable electronic devices. To meet this concern, it is known in the art to require the user to switch between detection modalities to accommodate their present use of a finger or stylus. Unfortunately, such an approach can be distracting and even non-intuitive and confusing to some users.

As another approach, it is known in the art to automatically interleave the use of finger-detection resources with the use of active-stylus-detection resources from one scan period to another. Using this approach avoids applying power to all available detection resources all the time. Unfortunately, this approach can result in considerable latency between the time a user makes a particular action with their finger/stylus and the time when the device reacts in a visually appropriate and corresponding manner.

DETAILED DESCRIPTION

Figure 1:
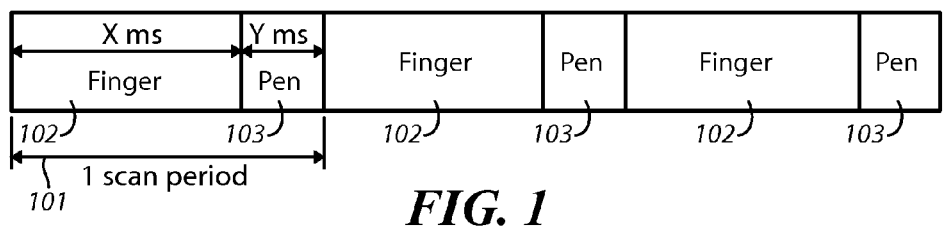
FIG. 1 is a timing diagram in accordance with the prior art.

Prior to discussing some specifics regarding the present teachings, it may be helpful to first present additional details regarding the particular prior art approach illustrated in FIG. 1. Using this approach, the display device, during a single scan period 101, in a first time window 102 uses the available finger-detection resources for some corresponding period of time (denoted here as X milliseconds) followed by a second time window 103 that sees use of the available stylus-detection resources for some corresponding period of time (denoted here as Y milliseconds). This might comprise, for example, using a set of infrared light transmitters and corresponding light sensors as the finger-detection resources and the light sensors only as the stylus-detection resources. This dual-windowed sequence of events then repeats for subsequent scan periods 101. A not-untypical duration for such a scan period is about fifteen milliseconds with the finger-detection windows often comprising the greater part of that total duration of time.

Generally speaking, when transmitters comprise a part of the utilized detection resources, all available transmitters are not simultaneously utilized. Instead, the available transmitters are each briefly utilized in a sequential manner to thereby scan the display's surface line-by-line over time for the user input device. Accordingly, during a single scan period, each such detection transmitter is used only a single time. By way of a simple illustration, then, if two hundred infrared transmitters comprise a part of the available finger-detection resources, each of these transmitters is used once, briefly, during each discrete scan period 101. If power consumption concerns are more relaxed, it is possible for more than one such transmitter to be utilized in parallel, but again in this case each transmitter will typically only be employed once during a given scan period.

The following describes an apparatus and method pertaining to a control circuit that controls detection of both finger-based input and active-stylus-based input as input via a display. In particular, during a single scan period, the control circuit interleaves use of the finger-detection resources with use of the active-stylus-detection resources.

So configured, the present teachings can match the overall use of resources achieved by the aforementioned prior art interleaving approach while also achieving improvements with respect to reduced latency. In some instances, for example, by one approach the present teachings may reduce worst-case latency by about fifty percent.

By one approach, the present interleaving approach can comprise using a first portion of the available finger-detection resources during a first time window of a given scan period and a second, different portion of the finger-detection resources during a second time window of that same scan period, wherein the first time window and the second time window are non-contiguous. By one approach, these first and second time windows are separated in time, at least in part, by the use of the active-stylus-detection resources.

The benefits of these teachings can be attained with the detection technologies of many already-fielded electronic devices. If desired, these teachings will readily accommodate modifying the programming of such devices to accord with these present teachings and thereby better leverage the availability and continued viability of those existing platforms. And, of course these teachings can be readily applied with respect to the specified behavior of new platforms as desired.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
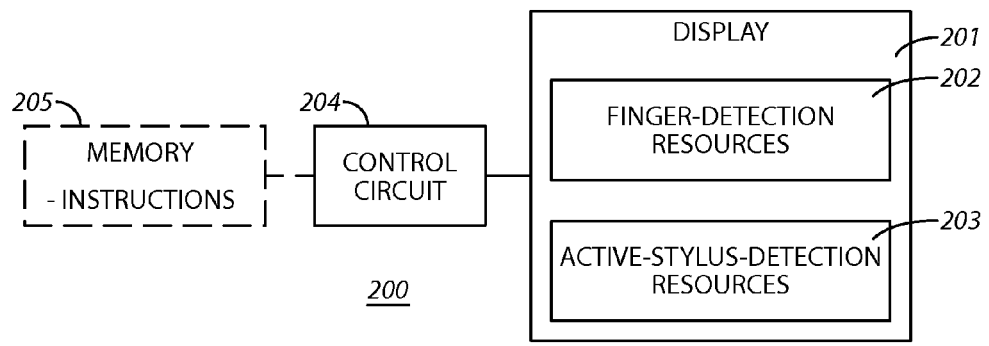
FIG. 2 is a block diagram in accordance with the disclosure.

FIG. 2 presents an apparatus 200 configured to accord with certain aspects of the present teachings. This apparatus 200 might comprise, for example, a portable electronics device such as a portable communications device (such as a so-called smartphone) or a tablet/pad-styled computer. Other examples are of course possible.

This apparatus 200 includes a display 201 having both finger-detection resources 202 and active-stylus-detection resources 203. It is possible for at least some of the finger-detection resources 202 to overlap with at least some of the active-stylus-detection resources 203 but these teachings will also accommodate application settings where the two sets of resources 202 and 203 are wholly physically and logically discrete from one another.

Figure 3:
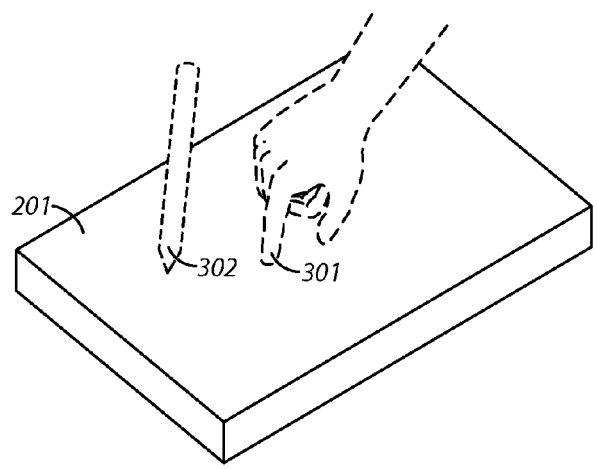
FIG. 3 is a perspective view in accordance with the disclosure.

So configured, and making momentary reference to FIG. 3, such a display 201 has the appropriate resources available to detect, for example, a user's finger 301 as well as a user's stylus 302 (sometimes also referred to as a "pen" herein) and to ascertain both a present (or nearly present) real-time location of those user input devices with respect to the display 201. (Generally speaking, a stylus is typically a hand-held writing utensil that often (but not exclusively) has a pencil-like elongated form factor and that includes at least one pointed end configured to interact with a drawing/writing surface. Using a stylus as an input mechanism with a display offers a variety of potential advantages over a fingertip including the opportunity for increased precision as well as an expression modality that accords with the user's own past experience with a pencil or pen.)

Figure 4:
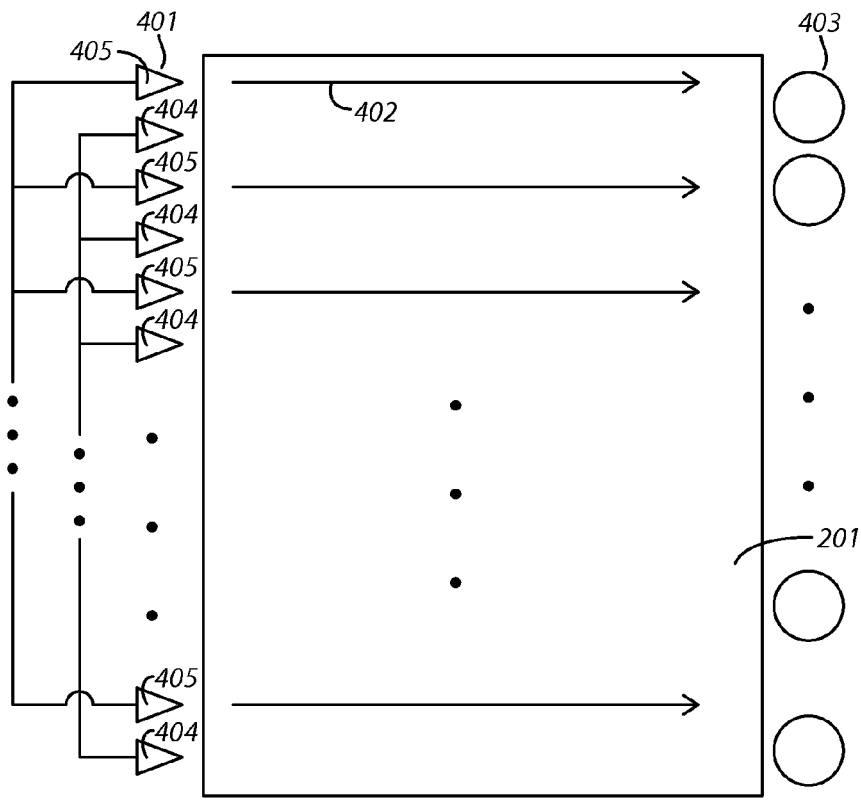
FIG. 4 is a top plan schematic view in accordance with the disclosure.

FIG. 4, in turn, provides a further illustrative example as regards the potential nature of such detection resources. (It will be understood that no particular limitations are intended by way of the specificity of these examples.) In this example, the finger-detection resources 202 include a plurality of infrared light transmitters 401 (such as, but not limited to, infrared light-emitting diodes as are known in the art) that are disposed to transmit their corresponding infrared light beams 402 across the display 201. A plurality of infrared light sensors 403, in turn, are disposed and configured to detect when such infrared light beams 402 arrive without being occluded by, for example, a user's fingertip.

In this illustrative example the infrared light transmitters 401 are only shown, for the sake of simplicity and clarity, along one edge of the display 201. These teachings will readily accommodate, however, disposing additional infrared light transmitters 401 and infrared light sensors 403 along more than one edge of the display 201. By one approach, for example, infrared light transmitters 401 may be disposed along two sides of the display 201 that are orthogonal to one another.

Generally speaking, a variety of finger and stylus-detection methodologies are known in the art and the specific examples described herein are provided by way of illustration and without intending any particular limitations in these regards. As the present teachings are not unduly sensitive to any particular choices in these regards, further elaboration here in these regards will not be provided for the sake of brevity.

Referring again to FIG. 2, the apparatus 200 also includes a control circuit 204 that operably couples to the display 201 (and, in particular, to the aforementioned finger and active-stylus-detection resources 202 and 203). Such a control circuit 204 can comprise a fixed-purpose hard-wired platform or can comprise a partially or wholly programmable platform. These architectural options are well known and understood in the art and require no further description here. This control circuit 204 is configured (for example, by using corresponding programming as will be well understood by those skilled in the art) to carry out one or more of the steps, actions, and/or functions described herein.

This control circuit 204 can operably couple to an optional memory 205 if desired. The memory 205 may be integral to the control circuit 204 or can be physically discrete (in whole or in part) from the control circuit 204 as desired. This memory 205 can serve, for example, to non-transitorily store the computer instructions that, when executed by the control circuit 204, cause the control circuit 204 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Figure 5:
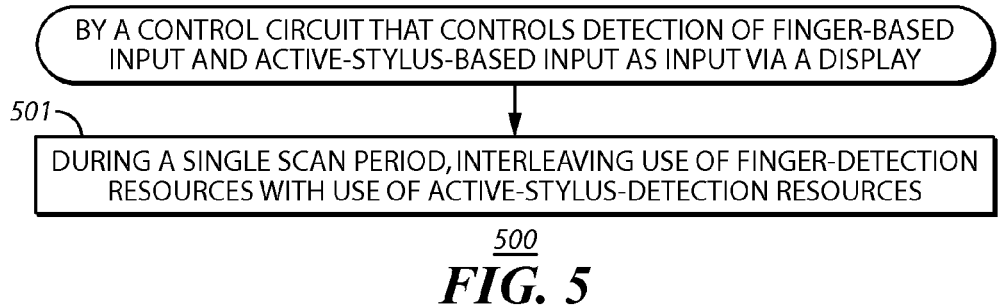
FIG. 5 is a flow diagram in accordance with the disclosure.

By one approach this control circuit 204 is configured to carry out the process 500 shown in FIG. 5. This includes having the control circuit 204, during a single scan period as described above, interleave 501 the use of the finger-detection resources 202 with the use of the active-stylus-detection resources 203.

Figure 6:
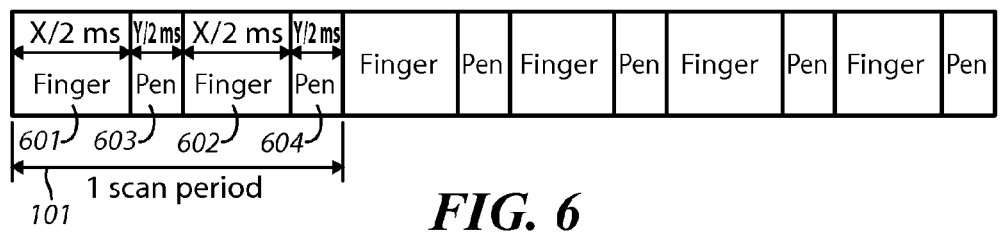
FIG. 6 is a timing diagram in accordance with the disclosure.

As one illustrative example in these regards, and referring now to both FIG. 4 and FIG. 6, by one approach this interleaving can comprise using a first portion 405 of the finger-detection transmitters 401 during a first time window 601 of a given scan period 101 and a second, different portion 404 of the finger-detection resources 401 during a second time window 602 of that same scan period 101, wherein the first time window 601 and the second time window 602 are non-contiguous with one another.

By one approach, and as illustrated, these two time windows 601 and 602 can be separated, at least in part, by the use of at least some of the active-stylus-detection resources 203 during an intervening time window 603. More particularly, and again as another non-limiting, illustrative example, this interleaving can comprise interleaving two separate, non-contiguous finger-detection time windows 601 and 602 with two separate, non-contiguous active-stylus-detection time windows 603 and 604 as illustrated.

By one approach, these various time windows can make essentially equal use of the corresponding resources. For example, if desired, the first time window 601 and the second time window 602 described above can use equal numbers of the aforementioned finger-detection transmitters 401. These teachings would accommodate other approaches in these regards, however, to suit the needs and/or requirements of a specific application setting.

By one approach, the described time windows can be essentially half the duration of their corresponding counterpart time windows as described with respect to FIG. 1. Accordingly, if the one time window 102 in the prior art approach for detecting fingers is X milliseconds in length, then each of the finger-detection time windows 601 and 602 in the approach illustrated in FIG. 6 can have a duration of X/2 milliseconds. The same approach can apply with respect to the active-stylus-detection time windows 603 and 604 as well if desired.

In the prior art approach the detection of a user's finger may be delayed by at least the duration of the active-stylus-detection time window 103 and possibly longer depending upon the scan-pattern employed during the finger-detection time window 102. Using an interleaving approach within a single scan period, however, such delays can typically be at least halved in their duration. This improvement in reduced latency, in turn, can contribute to a better real-time response capability of the corresponding apparatus 100.

These teachings are highly flexible in practice and will readily accommodate a wide variety of changes and alterations. As one example, the use of the available detection resources can be parsed further to thereby interleave an even greater number of corresponding time windows. As another example, if desired, it would be possible to use time windows having unequal durations and that accommodate a corresponding different number of detection resources. These teachings are also highly scalable in practice and will accommodate essentially any number of discrete detection components.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A method comprising:
   by a control circuit that controls detection of finger-based input and active-stylus-based input as input via a display:
      during a single scan period, interleaving use of finger-detection resources with use of active-stylus-detection resources by using a first portion of the finger-detection resources during a first time window and a second, different portion of the finger-detection resources during a second time window, wherein the first time window and the second time window are non-contiguous.

2. The method of claim 1 wherein the first and second time windows are separated in time, at least in part, by the use of the active-stylus-detection resources.

3. The method of claim 1 wherein the finger-detection resources include a plurality of finger-detection transmitters, and wherein interleaving the use of finger-detection resources with the use of active-stylus-detection resources comprises using a first portion of the finger-detection transmitters during a first time window and a second, different portion of the finger-detection transmitters during a second time window, wherein the first time window and the second time window are non-contiguous.

4. The method of claim 3 wherein the first portion of the finger-detection transmitters and the second portion of the finger-detection transmitters have an equal number of finger-detection transmitters.

5. A method comprising:
   by a control circuit that controls detection of finger-based input and active-stylus-based input as input via a display:
      during a single scan period, interleaving use of finger-detection resources with use of active-stylus-detection resources by interleaving two separate, non-contiguous finger-detection time windows during which time window at least some of the finger-detection resources are used with two separate, non-contiguous active-stylus-detection time windows during which time window at least some of the active-stylus-detection resources are used.

6. An apparatus comprising:
   a display having both finger-detection resources and active-stylus-detection resources;
   a control circuit operably coupled to the display and configured to control detection of finger-based input and active-stylus-based input as input via the display by, during a single scan period, interleaving use of the finger-detection resources with use of the active-stylus-detection resources by using a first portion of the finger-detection resources during a first time window and a second, different portion of the finger-detection resources during a second time window, wherein the first time window and the second time window are non-contiguous.

7. The apparatus of claim 6 wherein the first and second time windows are separated in time, at least in part, by the use of the active-stylus-detection resources.

8. The apparatus of claim 6 wherein the control circuit is configured to interleave the use of the finger-detection resources with the use of the active-stylus-detection resources by interleaving at least two separate, non-contiguous finger-detection time windows with at least two separate, non-contiguous active-stylus-detection time windows.

9. The apparatus of claim 6 wherein the finger-detection resources include a plurality of finger-detection transmitters, and wherein the control circuit is configured to interleave the use of the finger-detection resources with the use of the active-stylus-detection resources by using a first portion of the finger-detection transmitters during a first time window and a second, different portion of the finger-detection transmitters during a second time window, wherein the first time window and the second time window are non-contiguous.

10. The apparatus of claim 9 wherein the first portion of the finger-detection transmitters and the second portion of the finger-detection transmitters have an equal number of finger-detection transmitters.

11. A non-transitory memory having instructions stored therein, which instructions, when executed by a control circuit that controls detection of finger-based input and active-stylus-based input as input via a display, cause the control circuit to, during a single scan period, interleave use of finger-detection resources with use of active-stylus-detection resources by using a first portion of the finger-detection resources during a first time window and a second, different portion of the finger-detection resources during a second time window, wherein the first time window and the second time window are non-contiguous.

* * * * *